United States Patent
Yu et al.

(10) Patent No.: US 11,438,054 B2
(45) Date of Patent: Sep. 6, 2022

(54) METHOD AND DEVICE FOR SELECTING ANTENNA OR BEAM IN WIRELESS COMMUNICATION SYSTEM USING BEAMFORMING TECHNIQUE

(71) Applicant: Samsung Electronics Co., Ltd., Suwon-si (KR)

(72) Inventors: Hyunkyu Yu, Suwon-si (KR); Hyukmin Son, Hanam-si (KR); Jaewon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 16/324,809

(22) PCT Filed: Aug. 10, 2017

(86) PCT No.: PCT/KR2017/008702
§ 371 (c)(1),
(2) Date: Feb. 11, 2019

(87) PCT Pub. No.: WO2018/030820
PCT Pub. Date: Feb. 15, 2018

(65) Prior Publication Data
US 2019/0173562 A1    Jun. 6, 2019

Related U.S. Application Data

(60) Provisional application No. 62/373,600, filed on Aug. 11, 2016.

(51) Int. Cl.
*H04W 72/04*    (2009.01)
*H04B 7/08*    (2006.01)
(Continued)

(52) U.S. Cl.
CPC ............... *H04B 7/088* (2013.01); *H04B 7/06* (2013.01); *H04B 7/0617* (2013.01);
(Continued)

(58) Field of Classification Search
None
See application file for complete search history.

(56) References Cited

U.S. PATENT DOCUMENTS

2013/0072243 A1    3/2013    Yu et al.
2013/0315325 A1    11/2013    Wang et al.
(Continued)

FOREIGN PATENT DOCUMENTS

KR    10-2013-0030225 A    3/2013
KR    10-2014-0092165 A    7/2014
(Continued)

OTHER PUBLICATIONS

Korean Office Action dated Jan. 19, 2021, issued in Korean Application No. 10-2017-0101889.
(Continued)

*Primary Examiner* — Willie J Daniel, Jr.
(74) *Attorney, Agent, or Firm* — Jefferson IP Law, LLP

(57) ABSTRACT

The disclosure relates to a communication technique, which is a convergence of IoT technology and 5G communication system for supporting higher data transmission rate beyond 4G system, and a system for same. The disclosure can be applied to smart services (e.g., smart homes, smart buildings, smart cities, smart cars or connected cars, health case, digital education, retail businesses, security- and safety-related services and the like) on the basis of 5G communication technology and IoT-related technology. Disclosed are a device and a method enabling explicit or implicit indication of beam selection in order to select a beam between a terminal and a base station in a wireless communication
(Continued)

system using a beamforming technique, and enabling selection of a beam in correspondence with same.

21 Claims, 9 Drawing Sheets

(51) Int. Cl.
H04B 7/06 (2006.01)
H04L 5/00 (2006.01)

(52) U.S. Cl.
CPC ......... *H04B 7/0626* (2013.01); *H04B 7/0695* (2013.01); *H04B 7/08* (2013.01); *H04L 5/0048* (2013.01); *H04W 72/042* (2013.01); *H04W 72/046* (2013.01); *H04L 5/0007* (2013.01)

(56) References Cited

U.S. PATENT DOCUMENTS

| | | | |
|---|---|---|---|
| 2014/0126620 A1 | 5/2014 | Maltsev et al. | |
| 2014/0198681 A1 | 7/2014 | Jung et al. | |
| 2014/0294106 A1 | 10/2014 | Cordeiro et al. | |
| 2015/0236774 A1 | 8/2015 | Son et al. | |
| 2016/0119043 A1 | 4/2016 | Rajagopal et al. | |
| 2016/0142189 A1 | 5/2016 | Shin et al. | |
| 2016/0173183 A1 | 6/2016 | Kang et al. | |
| 2016/0192341 A1 | 6/2016 | Park et al. | |
| 2017/0207845 A1* | 7/2017 | Moon | H04B 7/0695 |
| 2019/0007116 A1* | 1/2019 | Chang | H04B 7/0684 |
| 2019/0089435 A1* | 3/2019 | Mondal | H04B 7/088 |
| 2019/0261329 A1* | 8/2019 | Park | H04L 5/005 |

FOREIGN PATENT DOCUMENTS

| | | |
|---|---|---|
| KR | 10-2015-0098324 A | 8/2015 |
| KR | 10-2016-0039572 A | 4/2016 |
| KR | 10-2016-0049461 A | 5/2016 |
| KR | 10-2016-0055086 A | 5/2016 |
| KR | 10-2016-0082465 A | 7/2016 |
| WO | 2013/085523 A1 | 6/2013 |

OTHER PUBLICATIONS

Korean Notice of Allowance dated Dec. 31, 2021, issued in Korean Application No. 10-2017-0101889.

* cited by examiner

METHOD AND DEVICE FOR SELECTING ANTENNA OR BEAM IN WIRELESS COMMUNICATION SYSTEM USING BEAMFORMING TECHNIQUE

CROSS-REFERENCE TO RELATED APPLICATION(S)

This application is a U.S. National Stage application under 35 U.S.C. § 371 of an International application number PCT/KR2017/008702, filed on Aug. 10, 2017, which is based on and claims priority under 35 U.S.C. § 119(e) of a U.S. Provisional application Ser. No. 62/373,600, filed on Aug. 11, 2016, in the U.S. Patent and Trademark Office, the disclosure of which is incorporated by reference herein in its entirety.

TECHNICAL FIELD

The disclosure relates to a method and a device for selecting an antenna in a wireless communication system, and more particularly, to a method and a device for selecting an antenna in a wireless communication system using a beamforming technique.

BACKGROUND ART

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system. In order to achieve high data transmission rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive multiple-input multiple-output (MIMO), full dimension MIMO (FD-MIMO), array antennas, analog beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) network where distributed entities, such as things, exchange and process information. The Internet of everything (IoE) technology, which is a combination of the IoT technology and big data processing technology through connection with a cloud server, has emerged. As technology elements, such as sensing technology, wired/wireless communication and network infrastructure, service interface technology, and security technology, have been demanded for IoT implementation, technologies of a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine-to-machine (M2M) communication, and machine type communication (MTC) have been implemented by techniques for beamforming, MIMO, and array antennas, which correspond to the 5G communication technology. As the big data processing technology as described above, application of a cloud radio access network (cloud RAN) would be an example of convergence between the 5G technology and the IoT technology.

In case of performing beamforming between a base station and a terminal in such a system, it is necessary to know the best beam being received from the base station in order for the terminal to perform a proper reception operation. In addition, in case where even the terminal receives beams of the base station by performing the beamforming, it is necessary for the terminal to find the best reception terminal beam. Further, it is necessary to know not only a received beam of the terminal but also an antenna and/or an antenna port of the terminal.

Accordingly, it is necessary for the terminal to select the best base station beam of the base station and the best terminal beam and an antenna of the terminal.

DISCLOSURE OF INVENTION

Technical Problem

An aspect of the disclosure provides a method and a device for selecting an antenna in a wireless communication system using a beamforming technique.

Another aspect of the disclosure provides a method and a device for beam refinement in a wireless communication system using a beamforming technique.

Still another aspect of the disclosure provides a method and a device for selecting an antenna based on an aperiodic reference signal in a wireless communication system using a beamforming technique.

Yet still another aspect of the disclosure provides a method and a device for beam refinement based on an aperiodic reference signal in a wireless communication system using a beamforming technique.

Solution to Problem

In accordance with an aspect of the disclosure, a method by a base station for indicating a terminal beam selection in a wireless communication system using a beamforming technique includes generating and transmitting, to a specific terminal through higher layer signaling, a beam refinement reference signal identifier for the terminal and configuration information of a beam refinement reference signal process; generating and transmitting, to the terminal, downlink control information including allocation information of a beam refinement reference signal and beam refinement indication information; transmitting a beam refinement reference signal based on the downlink control information and the higher layer signaling; and receiving beam refinement information reported from the terminal.

In accordance with another aspect of the disclosure, a base station device for indicating a terminal beam selection in a wireless communication system using a beamforming technique includes a radio processor configured to transmit and receive signals with at least one terminal; a memory storing base station beam information and base station beam mapping information to be transmitted to a terminal, terminal beam information, allocation information of a beam refinement reference signal, a beam refinement reference signal identifier, and a beam refinement reference signal process; and a base station processor configured to control to generate and transmit, to a specific terminal through the radio processor by higher layer signaling, the beam refinement reference signal identifier for the terminal and configuration information of the beam refinement reference signal process, generate and transmit, to the terminal through the radio processor, downlink control information including the allocation information of a beam refinement reference signal and beam refinement indication information, transmit the beam refinement reference signal based on the downlink control information and the higher layer signaling through the radio processor, and receive beam refinement information reported from the terminal.

In accordance with still another aspect of the disclosure, a method by a terminal for beam selection in a wireless communication system using a beamforming technique includes receiving a beam refinement reference signal identifier and configuration information of a beam refinement reference signal process through higher layer signaling; receiving allocation information of a beam refinement reference signal and beam refinement indication information through downlink control information; receiving a beam refinement reference signal for each of terminal beams based on the downlink control information and the higher layer signaling by sweeping the plurality of terminal beams; measuring a received signal strength of the received beam refinement reference signal corresponding to each of the terminal beams; selecting the terminal beam having a highest received signal strength based on the received signal strength measurement; and feeding terminal beam selection information and a reference signal identifier of the selected terminal beam back to a base station.

In accordance with still another aspect of the disclosure, a terminal device for beam selection in a wireless communication system using a beamforming technique includes a radio processor configured to transmit and receive signals with a base station; a memory storing information received from the base station and storing terminal beam information and beam reselection information; and a terminal processor configured to control the radio processor to receive higher layer signaling including a beam refinement reference signal identifier and configuration information of a beam refinement reference signal process, control the radio processor to receive downlink control information including allocation information of a beam refinement reference signal and beam refinement indication information, control the radio processor to receive a beam refinement reference signal for each of terminal beams based on the downlink control information and the higher layer signaling by sweeping the plurality of terminal beams, measure a received signal strength of the received beam refinement reference signal corresponding to each of the terminal beams, select the terminal beam having a highest received signal strength based on the received signal strength measurement, and control the radio processor to feed terminal beam selection information and a reference signal identifier of the selected terminal beam back to a base station.

In accordance with still another aspect of the disclosure, a method by a terminal for beam selection and antenna selection in a wireless communication system using a beamforming technique includes receiving a beam refinement reference signal identifier and configuration information of a beam refinement reference signal process through higher layer signaling; receiving allocation information of a beam refinement reference signal and beam refinement indication information through downlink control information; checking whether an antenna selection mode is configured in the downlink control information; configuring a received beam of the terminal based on the antenna selection mode being configured; receiving the beam refinement reference signal based on the downlink control information and the higher layer signaling while sweeping a plurality of terminal beams; measuring a received signal strength of the beam refinement reference signal for each of the terminal beams; calculating a coupling channel gain with respect to a combination of the measured received signal strength and the beam refinement reference signal; selecting an antenna having a best channel gain; and feeding selected antenna information back to a base station.

In accordance with still another aspect of the disclosure, a terminal device for beam selection and antenna selection in a wireless communication system using a beamforming technique includes a radio processor configured to transmit and receive signals with a base station; a memory storing information received from the base station and storing terminal beam information and beam reselection information; and a terminal processor configured to control the radio processor to receive a beam refinement reference signal identifier and configuration information of a beam refinement reference signal process through higher layer signaling, control the radio processor to receive allocation information of a beam refinement reference signal and beam refinement indication information through downlink control information, check whether an antenna selection mode is configured in the downlink control information, control the radio processor to configure a received beam of the terminal based on the antenna selection mode being configured, control the radio processor to receive the beam refinement reference signal based on the downlink control information and the higher layer signaling while sweeping a plurality of terminal beams, measure a received signal strength of the beam refinement reference signal for each of the terminal beams, calculate a coupling channel gain with respect to a combination of the measured received signal strength and the beam refinement reference signal, select an antenna having a best channel gain, generate a message for feeding selected antenna information back to a base station and control the radio processor to transmit the message.

Advantageous Effects of Invention

According to the aspects of the disclosure, it is possible to select the best beam of the base station and to select the best terminal beam. Further, the terminal feeds the selected beam back to the base station, and thus data transmission/reception efficiency in the base station can be increased. In addition, the terminal can select the best antenna and/or antenna of the terminal corresponding to the base station beam, and can provide the feedback therefor. Accordingly, the data transmission/reception efficiency in the base station can be increased.

MODE FOR THE INVENTION

Figure 1:
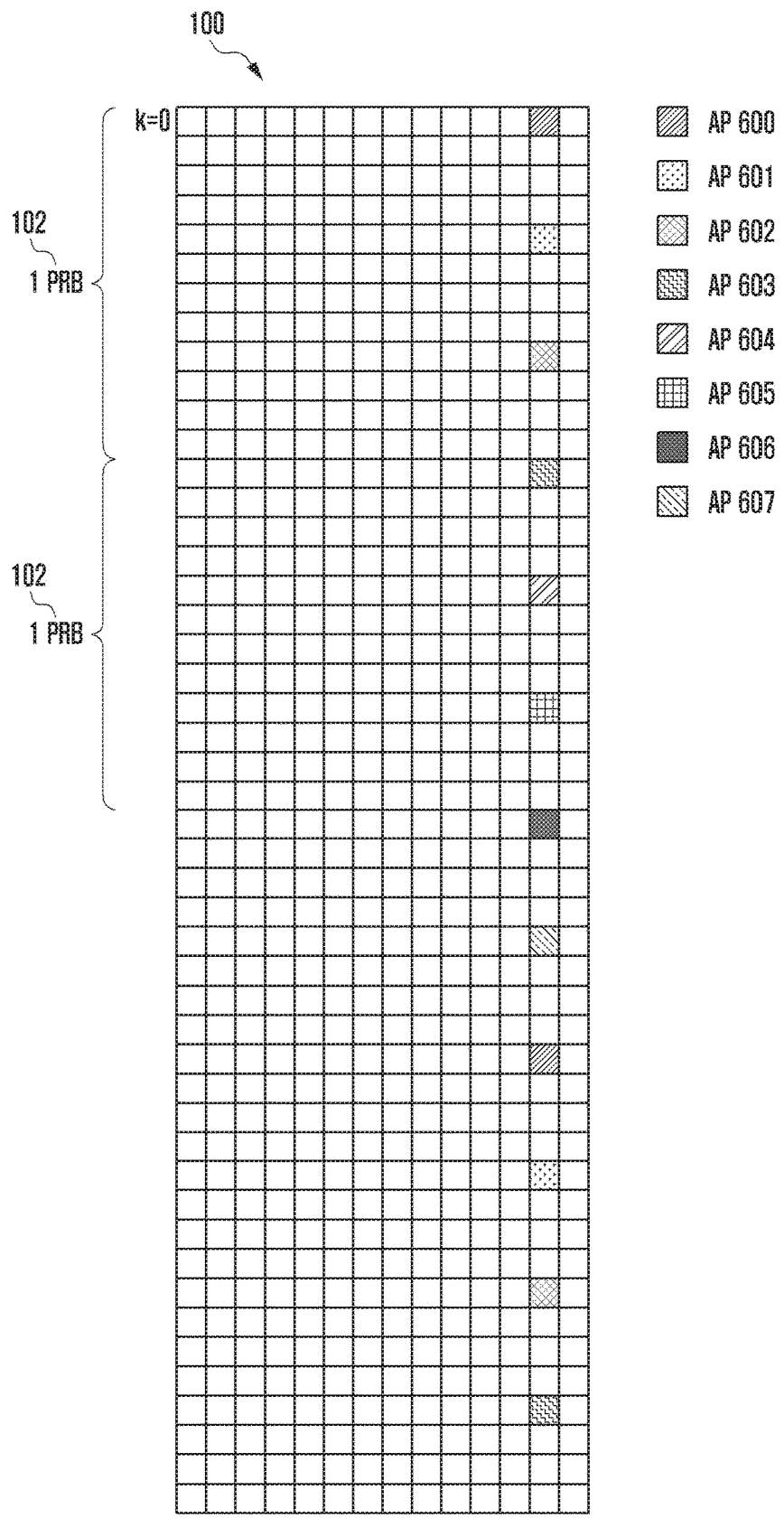
FIG. 1 is a diagram exemplifying a case where BRRS in an OFDM symbol is mapped to one symbol.

Hereinafter, various embodiments of the disclosure will be described in detail with reference to the accompanying drawings. In the accompanying drawings, it is to be noted that the same drawing reference numerals are used for the same elements. Further, the accompanying drawings of the disclosure are provided to help understanding of the disclosure, and it is to be noted that the disclosure is not limited to shapes or deployments exemplified in the drawings of the disclosure. Further, detailed explanation of known functions and configurations that may obscure the subject matter of the disclosure will be omitted. In the following description, only portions that are necessary to understand operations according to various embodiments of the disclosure will be described, and it is to be noted that explanation of other portions will be omitted to avoid obscuring the subject matter of the disclosure.

In the following description, a base station is a subject that performs resource allocation to a terminal, and may be at least one of an eNode B, Node B, base station (BS), radio connection unit, base station controller, and node on a network. Further, the terminal may include user equipment (UE), mobile station (MS), cellular phone, smart phone, computer, or multimedia system capable of performing a communication function. In the disclosure, a downlink (DL) is a radio transmission path of a signal that the base station transmits to the terminal, and an uplink (UL) means a radio transmission path of a signal that the terminal transmits to the base station.

Further, although embodiments of the disclosure are described hereinafter, the embodiments of the disclosure may also be applied to other communication systems having similar technical backgrounds or channel types. Further, the embodiments of the disclosure may also be applied to other communication systems through partial modifications thereof in a range that does not greatly deviate from the scope of the disclosure through the judgment of those skilled in the art.

In general, a cellular mobile communication system may be a representative example of a wireless communication system. In such a cellular mobile communication system, communication between a base station and a terminal is performed on a radio channel. In this case, a signal having a fixed transmission period, such as a periodic channel state information-reference signal (periodic CSI-RS) (hereinafter, referred to as "P-CSI-RS") or a sync signal, may be transmitted. The P-CSI-RS may be composed of a plurality of resources, and the respective resources may correspond to different base station beams. Such a corresponding relationship between the resources and the base station beams may be continuously maintained unless new configuration of the CSI-RS or an update of the configuration occurs. In the following description, the term "base station beam ID" may mean a discriminator corresponding to a resource of the P-CSI-RS.

Further, the base station may aperiodically transmit an aperiodic channel state information-reference signal (aperiodic CSI-RS) (hereinafter, referred to as "AP-CSI-RS"). Whether or not the base station is to transmit the AP-CSI-RS may be pre-indicated to the terminal through downlink control information (hereinafter, referred to as "DCI"). In this case, the AP-CSI-RS may be composed of a plurality of resources, and the respective resources may correspond to different beams transmitted by the base station. The corresponding relationship between the resources constituting the AP-CSI-RS and the beams transmitted by the base station may be defined by methods presented in the disclosure to be described hereinafter. According to embodiments presented in the disclosure, the corresponding relationship may be explicitly configured to the terminal by the base station. According to other embodiments presented in the disclosure, the corresponding relationship may also be implicitly configured.

In the following description, the AP-CSI-RS may be replaced by a beam refinement reference signal (hereinafter, referred to as "BRRS"). Hereinafter, for convenience in explanation, an operation method and a device for beam refinement and antenna selection will be described based on the BRRS.

First, the BRRS may be generated by the base station in a method below, and may be transmitted to the terminal. In one OFDM symbol for transmitting the BRRS, eight antenna ports may be defined in total, and transmission beams of the base station that transmits reference signals on respective antenna ports may differ from one another. This will be described hereinafter.

Beam Refinement Reference Signals

Beam refinement reference signals are transmitted using eight antenna ports p=600, . . . , 607. Transmission and reception of the BRRS is dynamically scheduled in the downlink resource allocation on xPDCCH.

Sequence Generation

The reference signal $r_{l,n_s}(m)$ may be generated as in mathematical expression 1 below.

$$r_{l,n_s}(m) = \frac{1}{\sqrt{2}}(1-2\sigma(2m)) + j\frac{1}{\sqrt{2}}(1-2\sigma(2m+1)),$$

$$m = 0, 1, \ldots \left\lfloor \frac{3}{8} N_{RB}^{max,DL} \right\rfloor - 1$$

Mathematical expression 1

In mathematical expression 1, $n_s$ is the number of slots within one radio frame, l is the number of OFDM symbols within the slot, and c(n) denotes a pseudo-random sequence defined by clause 7.2 V5G.211 of 5G standard document. At the start of each OFDM symbol, a pseudo-random sequence generator should be initialized with mathematical expression 2 below.

$$c_{init} = 2^{10}(7(\bar{n}_s+1)+l+1)(2N_{ID}^{BRRS}+1)+2_{ID}^{BRRS}+1.$$

$$\bar{n}_s = n_s \bmod 20,$$

Mathematical expression 2

The quantity $N_{ID}^{BRRS}$ is configured to a terminal (UE) via RRC signaling.

Mapping to Resource Elements

The reference signal sequence $r_{l,m_s}(m)$ should be mapped to complex-valued modulation symbols $\alpha_{k,l}^{(p)}$ on antenna port p according to mathematical expression 3 below.

$$a_{4k'+k_0,l}^{(p)} = \begin{cases} r_{l,n_s}(m) & k' = p + 4 \times m - 600 \\ 0 & \text{otherwise} \end{cases}$$

Mathematical expression 3

In mathematical expression 3, $$k_0 = \begin{cases} 0 & \text{if } 4k' < \left\lfloor \frac{N_{RB}^{DL} N_{sc}^{RB}}{2} \right\rfloor \\ 3 & \text{otherwise} \end{cases}.$$

The BRRS may be transmitted in OFDM symbols l within a subframe, where l is configured by 'indication of an OFDM symbol index for CSI-RS/BRRS allocation' in DCI formats. On each Tx antenna port, the BRRS may be transmitted with a different Tx beam.

FIG. 1 is a diagram exemplifying a case where a BRRS in an OFDM symbol is mapped to one symbol.

FIG. 1 exemplifies that an OFDM symbol 100 is composed of a plurality of physical resource blocks (PRBs) 101, 102, and so on. Further, FIG. 1 exemplifies a case where three different BRRSs are respectively mapped to one OFDM symbol for each PRB. Further, in FIG. 1, reference numerals 600 to 607 given to the respective BRRSs correspond to antenna port numbers as described above.

The disclosure to be described hereinafter is not limited to specific patterns, such as the respective PRBs exemplified in FIG. 1. That is, in the disclosure to be described hereinafter, the number of ports, RE mapping intervals between ports on a frequency axis, and location of RE-mapped OFDM symbol may be optionally configured by the base station.

The BRRS transmission may be exemplified in FIG. 1, and may be triggered by the DCI as described above. For example, the following DCI may be used. That is, the DCI may include a field, such as "CSI/BSI/BRI request". If a value "010" or "011" is indicated in the "CSI/BSI/BRI request" field, the terminal can recognize that the BRRS is transmitted after m subframes from subframe n in which the DCI is transmitted. The value m can be transferred through "transmission timing of CSI-RS/BRRS" field included in the DCI. The details of the "CSI/BSI/BRI request" field of the DCI are as follows.

CSI/BSI/BRI request-3 bits

If the indicated value is 000, then none of CSI/BSI/BRI is requested.

Else if the indicated value is 001, then this DCI format triggers BSI reporting.

Else if the indicated value is 010, then this DCI format allocates the BRRS and also triggers the corresponding BRI reporting.

Else if the indicated value is 011, then this DCI format allocates the BRRS, but does not trigger BRI reporting.

Else if the indicated value is 100, then this DCI format allocates the CSI-RS and also triggers the corresponding CSI reporting.

The values 101, 110, and 111 are reserved.

Transmission timing of CSI-RS/BRRS-2 bits, wherein this field indicates a transmission time offset value $m \in \{0, 1, 2, 3\}$.

If this DCI format allocates either of CSI-RS or BRRS, then the corresponding transmission is allocated in subframe n+m.

Otherwise, they should be set to zeros in all.

If this DCI format allocates either of CSI-RS or BRRS transmission,

Process indicator-2 bits is as follows.

00: {Process #0}, 01: {Process #1}, 10: {Process #2}, 11: {Process #3}

One BRRS may correspond to one process, and in order to define the one BRRS process, information in Table 1 below may be predefined between the base station and the terminal.

TABLE 1

| Description | Bit length |
|---|---|
| BRRS resource ID 0, BRRS resource ID 1, ..., BRRS resource ID 7 | Antenna Ports to be measured for each BRRS resource (up to 8 ports) (8 bit bitmap for ports 600 to 607). 8 * 8 = 64 bits |

One process may maximally include 8 resources, and one resource corresponds to one or more BRRS antenna ports. In case where one resource corresponds to one antenna port, the terminal may recognize a received signal received power (hereinafter, referred to as "RSRP") value measured through the antenna port as a beam quality value for the resource. In case where one resource corresponds to a plurality of antenna ports, the terminal may recognize a value obtained by adding or averaging RSRP values measured through the plurality of antenna ports as a beam quality value for the resource. In Table 1 as above, 8-bit bitmap is used for each resource in order to configure the corresponding relationship between one BRRS resource and 8 BRRS antenna ports. If the n-th bit of the bitmap is 1, it means that there exists the corresponding relationship between the BRRS resource and the n-th antenna port.

Further, several processes may be predefined through configuration between the base station and the terminal. Information on what process the BRRS triggered by the DCI corresponds to may be indicated to the terminal through a "process indicator" field in the DCI. For example, if four processes are provided, one of process indexes #0, #1, #2, and #3 of the BRRS triggered by the DCI may be indicated through the "process indicator" field included in the DCI.

That is, as described above with reference to Table 2, two or more processes may be indicated through the DCI.

If the base station indicates a value "010" in the "CSI/BSI/BRI request" field of the DCI, and the DCI triggers the BRRS of a specific process, the terminal may receive the BRRS corresponding to the process, and then may select N BRRS resources to feed the selected BRRS resources back to the base station. Here, the value N may be fixed to a specific value in accordance with the pre-configuration between the base station and the terminal, or the DCI may indicate the specific value. In case of selecting N BRRS resources, the terminal may select higher N resources with reference to beam quality value information of the resources measured by the terminal.

The base station may transfer a BRRS request message to the terminal through the DCI. In the DCI, the location of a subframe in which the BRRS is transmitted, antenna port, OFDM symbol, and subcarrier location information may be indicated based on information predefined by higher layer signaling, for example, RRC signaling. In this case, a plurality of BRRS identifiers (hereinafter, referred to as "BRRS ID") are defined through a specific time, frequency, and antenna, and the corresponding BRRS ID becomes the BRRS transferred from a specific OFDM symbol to a specific antenna port. Beams are measured with respect to a plurality of BRRS signals transmitted by the base station, that is, a plurality of BRRS resource ID (hereinafter, referred to as "BRRS-RI"), and N BRRS-RIs having high measurement values and the corresponding RSRPs are fed back to the base station. Through this, performing of a refinement operation may be completed.

In an embodiment of the disclosure, one subframe indicated through the DCI may be allocated to the BRRS, or the last one or two OFDM symbols within one subframe may be allocated for BRRS transmission. In this case, it may be defined that allocation of one subframe unit is allocated only with respect to 10 symbols excluding two front/rear symbols.

As described above, in an embodiment of the disclosure, the BRRS may be replaced by the AP-CSI-RS to be applied. In this case, the BRRS-RI corresponds to a CSI-RS resource index (hereinafter, referred to as "CRI") included in the AP-CSI-RS. That is, the base station may trigger the AP-CSI-RS including M resources through the DCI, and the terminal may select N resources among M resources based on the result of receiving the AP-CSI-RS. The terminal may feed CRI values corresponding to the selected N resources back to the base station. In this case, the terminal may feed both the RSRP values and the CRI values corresponding to the selected N resources back to the base station.

1. Base Station and Terminal Beam Refinement

It is defined that base station beam refinement is to find an optimized beam of a base station for a specific terminal. For example, if it is assumed that base station beam A from the viewpoint of a transmitter and terminal beam B from the viewpoint of a receiver have currently been configured, the base station beam refinement may be a process of finding an optimized beam based on the terminal beam B among beams surrounding the base station beam A. Even in case where the transmitter and the receiver are oppositely configured, configuration of an optimized beam between the terminal and the base station may be called beam refinement.

That is, it may be defined that the terminal beam refinement is to find an optimized beam from the viewpoint of the terminal with respect to the base station beam of a specific base station. For example, if it is assumed that the terminal beam A and the base station beam B are currently configured, the terminal beam refinement is a process of finding an optimized beam based on the base station beam B among beams surrounding the terminal beam A.

It is assumed that the base station currently shares information on a usable beam list between the base station and the terminal through periodic/aperiodic beam feedbacks from the terminal. For convenience in explanation, it is assumed that information on N best beam pairs is updated and maintained based on the RSRP between the base station and the terminal, and the beam pair having the highest RSRP among the N best beam pairs is used for the current service. Further, the base station manages N best base station beams, and the terminal has N terminal beams corresponding to N best beams of the base station fed back to the base station.

As described above, the base station may transmit a signal having a fixed transmission period, such as a P-CSI-RS or sync signal. The P-CSI-RS having a fixed period includes resources corresponding to a plurality of beams. The terminal may select N resources among the resources based on the RSRP measurement for the resources. Further, the terminal may feed CRI values corresponding to the N resources back to the base station. The terminal may configure terminal received beams with respect to the resources corresponding to the N feedback CRIs, respectively.

In the following description, "base station beam ID" may mean a discriminator corresponding to the resource of the P-CSI-RS. Further, in the following description, it is assumed that the base station and the terminal share N base station beam IDs, and they are called a serving beam list. As one of methods for determining the base station beam IDs included in the best beam list, CRI feedback information of the terminal may be used, but the following embodiments are not limited thereto.

Figure 2:
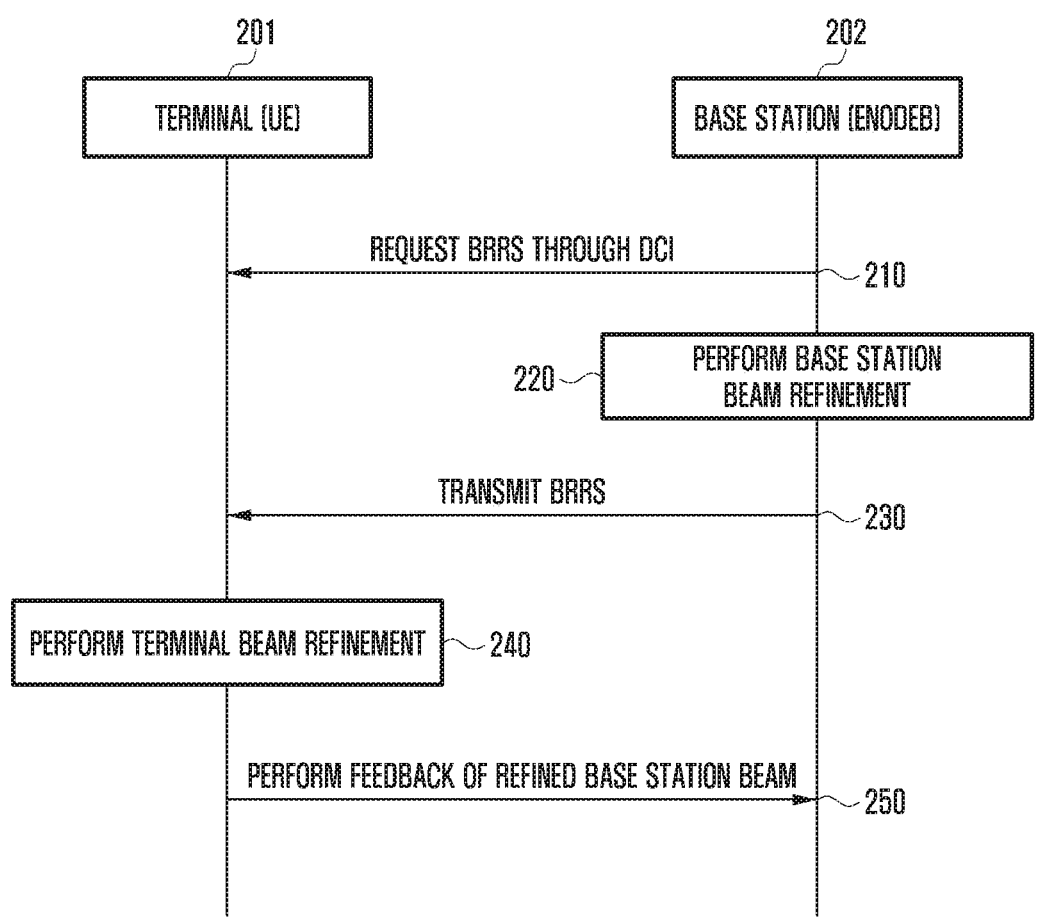
FIG. 2 is an exemplary diagram exemplifying an operation procedure between a base station and a terminal for beam refinement according to an embodiment of the disclosure.

FIG. 2 is an exemplary diagram exemplifying an operation procedure between a base station and a terminal for beam refinement according to an embodiment of the disclosure.

First, although a terminal 201 may have various types as described above, in the following description, for convenience in explanation, it is assumed that the terminal 201 is user equipment (UE). Further, although a base station 202 may have various types as described above, in the following description, for convenience in explanation, it is assumed that the base station 202 is eNodeB.

It is assumed that the base station 202 pre-shares necessary information with the terminal 201 through higher layer signaling, and the necessary information will be described in detail hereinafter.

At operation 210, the base station 201 may transmit a BRRS request message to the terminal through the DCI. Thereafter, the base station 201, at operation 220, performs base station beam refinement. Here, the beam refinement may be an operation for the base station 202 to determine beams to be transmitted to the terminal 201. If identifier information of the beams to be transmitted is provided through the DCI, operation 220 may be an operation to configure the base station beam to be transmitted. If the configuration of the base station beam to be transmitted is completed at operation 220, the base station 202, at operation 230, may insert the BRRS in the corresponding beam to be transmitted.

On the other hand, after the terminal 201 receives the BRRS request message from the base station 202 through the DCI at operation 210, the terminal 201 waits for reception of the base station beam including the BRRS from the base station 202. Thereafter, if the terminal 201 receives the beam including the BRRS at operation 230, the terminal 201 proceeds with operation 240, and searches for the best beam by measuring the received signal strength of the BRRS. In the following description, it is called performing of terminal beam refinement. If the performing of the terminal beam refinement as described above is completed, the terminal 201, at operation 250, may feed the refined base station beam back to the base station 202.

The operations as described above will now be described in more detail.

In case of the base station beam refinement operation at operation 220, in order for the base station 202 to perform the beam refinement with respect to a specific beam among N beams or a plurality of beams, the base station should indicate, to the terminal 201, what beams among the N beams are to come down and where the beams are to come down from before the BRRS transmission. Through reception of the corresponding indication, the terminal 201 can receive the BRRS signal transmitted by a specific base station beam. In this case, the terminal 201 receives the BRRS signal using the specific terminal beam corresponding to the base station beam transmitted by the base station 202. As described above, it is possible to measure the received signal strength (RSRP) of the received base station beam using the terminal beam.

During the BRRS transmission, the base station 202 may include the pre-indicated base station beam in the BRRS to be transmitted to the terminal 201 by optionally configuring at least one base station beam surrounding an indication beam for the base station beam refinement. Accordingly, the terminal 201 measures the corresponding BRRS, and performs feedback of the BRRS-RI and RSRP having the highest received signal strength to enable the refinement for the base station beam to be performed.

As methods for the base station 202 to indicate the beam being used during the BRRS transmission among the N beams to the terminal 201, the following methods may be used. For example, the base station may transfer, to the terminal through the methods proposed below, information on what base station beam ID(s) resource(s) included in the AP-CSI-RS is associated with.

(1) Method for indicating base station beams being used for the BRRS transmission in the DCI for BRRS requirements: In case of performing base station beam refinement for specific beams, it is possible to contain index information on corresponding beams in the DCI to be transmitted. Further, it is possible to periodically/aperiodically transmit the index information through higher layer signaling (e.g., RRC signaling) or control message (e.g., MAC-CE). In this case, it is exemplified that the index information can take the types in Table 2 below.

TABLE 2

| Indication bits | Beam index |
| --- | --- |
| 00 | Beam #10 |
| 01 | Beam #1 |
| 10 | Beam #6 |
| 11 | Beam #27 |

The base station 202 may transmit index information constructed as in Table 2 to the terminal 201, and the terminal 201 may receive the beam that is used during the transmission of the BRRS transmitted by the base station 202 as a terminal beam based on the received index information, and then may determine the best base station beam(s). Thereafter, the terminal 201 may feed information on the best base station beam(s) back to the base station 202, and thus the base station 202 may transfer the information on the beam being used during the BRRS transmission. That is, the base station 202 may map tag indexes up to "0, 1, . . . , N−1" to N beam IDs using RRC or MAC-CE. The N base station beam IDs may be equal to the N base station beam IDs included in the serving beam list.

Table 2 exemplifies a case where beam IDs #10, #1, #6, and #27 are respectively mapped to tags 0, 1, 2, and 3 in case of N=4. The tag indexes may be expressed as 00, 01, 10, and 11 respectively using $\log_2(N)$ bits. When the base station 202 triggers the AP-CSI-RS using the DCI, the tag index information may be included in the DCI. If one tag index is included in the DCI, the terminal may be assumed that all resources included in the AP-CSI-RS are associated with the base station beam IDs corresponding to the tag indexes. That is, the terminal 201 may receive the resources included in the AP-CSI-RS using the terminal received beam corresponding to the base station beam ID, and may measure RSRP values with respect to the resources.

Further, according to an embodiment of the disclosure, BRRS IDs transmitted by N base station beams being operated may be predefined. Hereinafter, for convenience in explanation, it is assumed that four reference BRRS processes are defined, and there are 8 BRRS IDs in each process. Among them, the BRRS IDs defined in a specific BRRS process can be mapped to N base station best beams to be operated.

For example, the first BRRS process may be defined as a process always used for the base station beam refinement, and BRRS IDs {#0, #1}, {#2, #3}, {#4, #5}, and {#6, #7} may be respectively mapped to N base station beams, so that the base station beams mapped to the two corresponding BRRS IDs and beams for the corresponding beam refinement may be transmitted. Various mapping schemes between the base station beams and the BRRS processes or the BRRS IDs are possible, and may include mapping of a specific BRRS process or BRRS ID to the base station beam in the beam list that the base station 202 and the terminal 201 have. In this case, it is assumed that N base station beams are aligned along the RSRPs, and mapping of the beams in the corresponding order to the BRRS processes or BRRS IDs is also included therein. That is, it means an implicit association relationship between N base station beam IDs included in the serving beam list and M resources included in the AP-CSI-RS corresponding to the specific process. For example, in case of M=L×N, the M resources are grouped L by L to form N groups in total. More specifically, if an M value is 8, an L value is 2, and an N value is 4, the AP-CSI-RS includes resources corresponding to CRI values 0, 1, 2, . . . , 7. Further, the L value is 2 based on the CRI, and thus the total N values may generate four groups, such as {0, 1}, {2, 3}, {4, 5}, and {6, 7}, through grouping two by two. In this case, the respective groups have the association relationship with N base station beam IDs included in the serving beam list.

According to the disclosure, during the base station beam refinement, terminal beam refinements may be simultaneously performed with respect to beams transmitted by the base station. That is, repeated signal patterns are generated within one OFDM symbol by the BRRS transmission structure, and thus it is possible to measure the corresponding BRRS signal with the terminal beam corresponding to the BRRS signal coming down for the base station beam refinement and certain terminal beams for the terminal beam refinement. This will be described in more detail with reference to the accompanying drawings.

Figure 3:
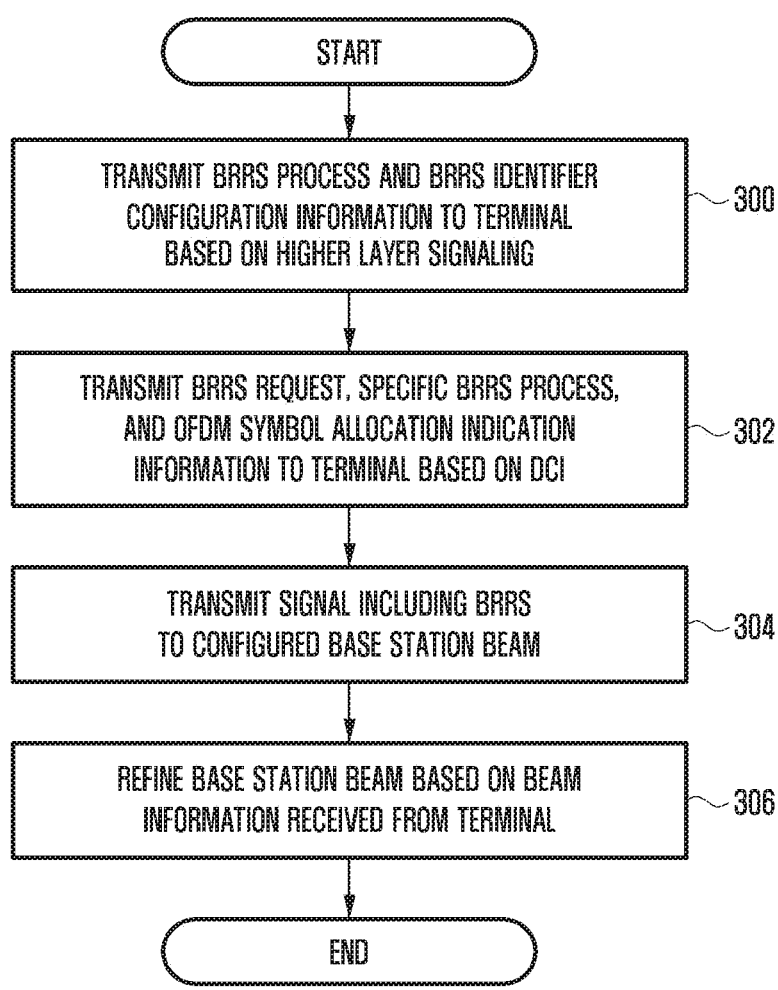
FIG. 3 is a control flowchart explaining an operation for beam refinement by a base station according to an embodiment of the disclosure.

FIG. 3 is a control flowchart explaining an operation for beam refinement by a base station according to an embodiment of the disclosure.

At operation 300, the base station 202 may transmit BRRS process and BRRS identifier configuration information to the terminal based on higher layer signaling. As described above, the information may be transmitted by the higher layer signaling, for example, RRC signaling, or may be transmitted periodically/aperiodically through a control message, for example, MAC-CE.

Thereafter, at operation 302, the base station 202 may include a BRRS request, a specific BRRS process, and OFDM symbol allocation indication information in the DCI and may transmit the DCI to the terminal. As described above, at operation 302, the BRRS request message may be included in the DCI to be transmitted. Further, by including allocation indication information in both the specific BRRS process and the OFDM symbol to be transmitted, the terminal 201 can pre-identify, from the DCI, the requested BRRS and the signal transmission location within a certain BRRS process and OFDM symbol. The DCI as described above may be performed in case where beam refinement and antenna selection are necessary based on the BRRS measurement.

Thereafter, the base station 202, at operation 304, may transmit the BRRS based on the higher layer signaling information and the DCI. Thereafter, the base station 202 waits for reception of information on the beam refinement from the terminal 201. At operation 306, the base station 202 may receive beam information received from the terminal 201, and may refine the base station beam based on the received beam information. This is to select an optimum beam between the terminal 201 and the base station 202. Through this, communication efficiency between the terminal 201 and the base station 202 can be increased. That is, the terminal 201 may perform feedback by selecting the best terminal beam information among the base station beams transmitted by the base station 202 and/or the optimum base station beam among the plurality of base station beams. If the optimum beam information is received, the base station 202 may refine the base station beam based on the feedback information.

Figure 4:
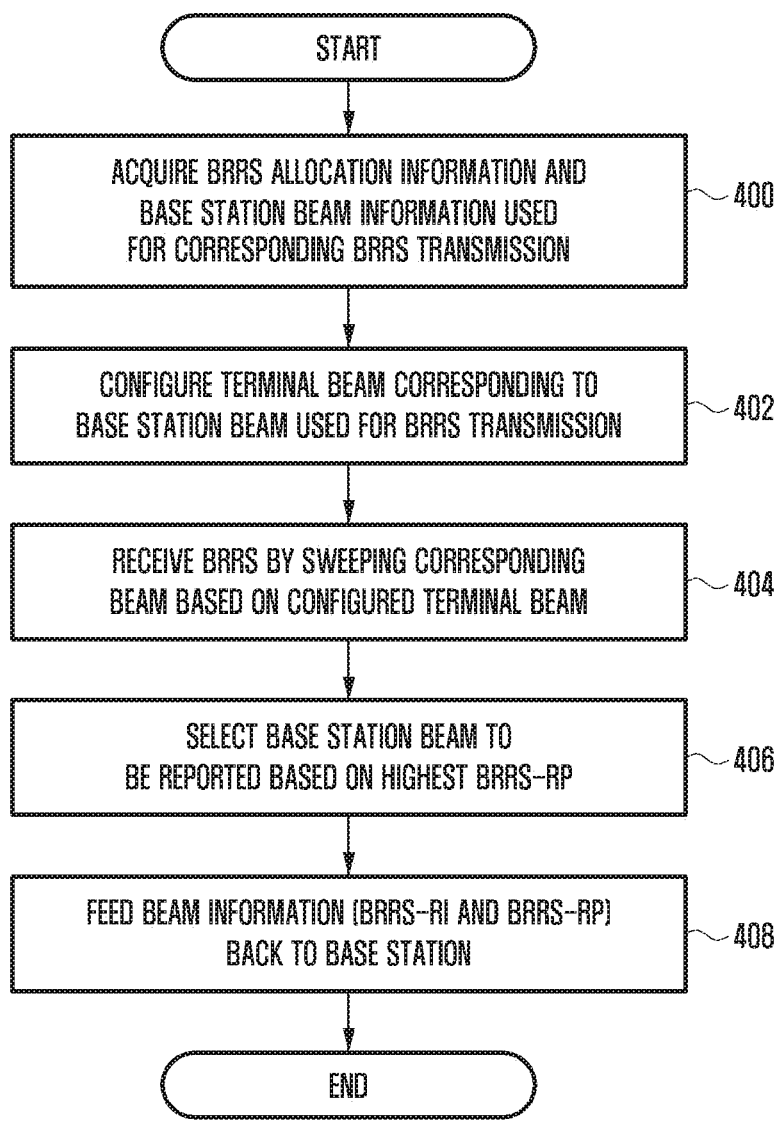
FIG. 4 is a control flowchart explaining a beam refinement operation by a terminal according to an embodiment of the disclosure.

FIG. 4 is a control flowchart explaining a beam refinement operation by a terminal according to an embodiment of the disclosure.

At operation 400, the terminal 201 may acquire BRRS allocation information and base station beam information used for the corresponding BRRS transmission. As described above, such information may be transmitted by higher layer signaling, for example, RRC signaling, or may be received periodically/aperiodically through a control message, for example, MAC-CE.

Thereafter, the terminal 201, at operation 402, may configure a terminal beam corresponding to a base station beam used for BRRS transmission. More specifically, the base station 202 may transmit a large number of beams in order to transmit beams in plural directions in a specific sector or in full directions in a cell of the base station. Accordingly, it is necessary for the base station 202 to identify the base station beam to be transmitted to the terminal 201. The terminal 201 may also form plural received beams. If the terminal received beam is formed in a direction in which the base station 202 transmits the base station beam, the pair of the two beams may be the optimum pair. However, if the terminal received beam is formed in a different direction, reception between the base station beam and the terminal beam becomes inferior. Accordingly, the terminal 201 can configure a proper terminal beam for receiving the base station beam.

Thereafter, the terminal 201, at operation 404, may receive the BRRS by sweeping the terminal beam based on the configured terminal beam. For example, the following explanation may be made. It is assumed that the terminal 201 has four different terminal beams for signal reception. In this case, if it is assumed that serial numbers 1, 2, 3, and 4 are respectively given to the four terminal beams for the signal reception, terminal #1 beam, terminal #2 beam, terminal #3 beam, and terminal #4 beam may be terminal beams in different directions. In this case, at operation 402, the terminal may configure the terminal #2 beam as the terminal beam to receive the BRRS, and may measure the RSRP value. If such an operation is performed only with respect to the terminal #2 beam, the terminal 201 is unable to identify whether terminal #2 beam is an optimum beam for receiving the base station beam. Accordingly, in case of using the terminal #2 beam at operation 404, the terminal 201 may receive the BRRS using the next terminal #3 beam, measure the RSRP value, receive the BRRS using the next terminal #4 beam, measure the RSRP value, and last receive the BRRS using the terminal #1 beam, and measure the RSRP value. As described above, the terminal may receive the BRRS and measure the RSRP through the sweeping operation with respect to all the terminal beams. The operation 404 may be performed with respect to the respective base station beams if the BRRS is performed with respect to two or more base station beams.

Thereafter, the terminal 201, at operation 406, may select the base station beam to be reported based on the highest BRRS RSRP (hereinafter, referred to as "BRRS-RP"). That is, the terminal 201 may select the base station beam including the highest BRRS-RP value with respect to two or more base station beams. In this case, if needed, the terminal 201 may additionally select and transmit at least one different base station beam in addition to the base station beam having the highest BRRS-RP value. Even in case of additionally selecting at least one different base station beam, the terminal 201 can select the base station beams having high BRRS-RP values.

After selecting the base station beam to be reported at operation 406, the terminal 201, at operation 408, may feed the beam information back to the base station. In this case, as described above, the beam information may include BRRS-RI and BRRS-RP information. Further, as the beam information, only one piece of base station beam information may be transmitted, and if needed, two or more pieces of base station beam information may be fed back.

2. Support of Terminal Beam Refinement Mode

The base station beam refinement has been the above-described. Hereinafter, terminal beam refinement will be described. The BRRS as described above may be used for the purpose of the terminal beam refinement.

For example, if there is no request for beam information on the BRRS, that is, for BRRS-RI and BRRS-RP (RSRP in LTE) reporting through the DCI, the terminal may be defined to perform terminal beam refinement through the BRRS. If the terminal beam refinement is performed with respect to the current base station beam, the terminal can immediately apply a beam change to the corresponding beam. In order to support the BRRS operation for the purpose of the terminal refinement, the terminal should also know an indication for the base station beam being used for the current service. For this, in addition to the base station beam indication scheme as described above, applicable schemes will be described.

(1) Definition scheme of a refinement mode based on BRRS resource configuration:

If 10/5/2/1 OFDM symbol allocation is possible for the BRRS, in case of allocating 2 OFDM symbols or one OFDM symbol, it is defined that the BRRS is transmitted only with the base station beam being used for the current service. In case of 5 OFDM symbols, it is defined that the BRRS is transmitted with the base station beam being currently serviced and base station beam refinement beams, and in case of BRRS transmission resources using the base station beam being currently serviced, it is possible to apply the indication proposed in the 'base station/terminal beam refinement'. In case of 10 OFDM symbols, beam refinement can be performed through base station/terminal beam sweeping without any specific indication. If the number of OFDM symbols is large, there is an opportunity to be able to train the whole received beams of the terminal, and it is possible to perform an operation without any indication for the base station beams. In an embodiment of the disclosure, the operation may include the whole base station terminal beam refinement mode including a terminal beam refinement mode. This will be described in more detail.

(2) Base station beam configuration scheme according to existence/nonexistence of a BRRS beam information report:

The base station beam configuration scheme according to existence/nonexistence of the BRRS beam information report is defined as a terminal beam refinement mode operation in case of transmitting the BRRS without the BRRS beam information report through the DCI, and the BRRS is transmitted only to the beam that the base station currently uses for the service during the corresponding BRRS transmission. Further, the BRRS transmitted based on a specific BRRS process or BRRS ID is transmitted only to the beam that the base station currently uses for the service.

Figure 5:
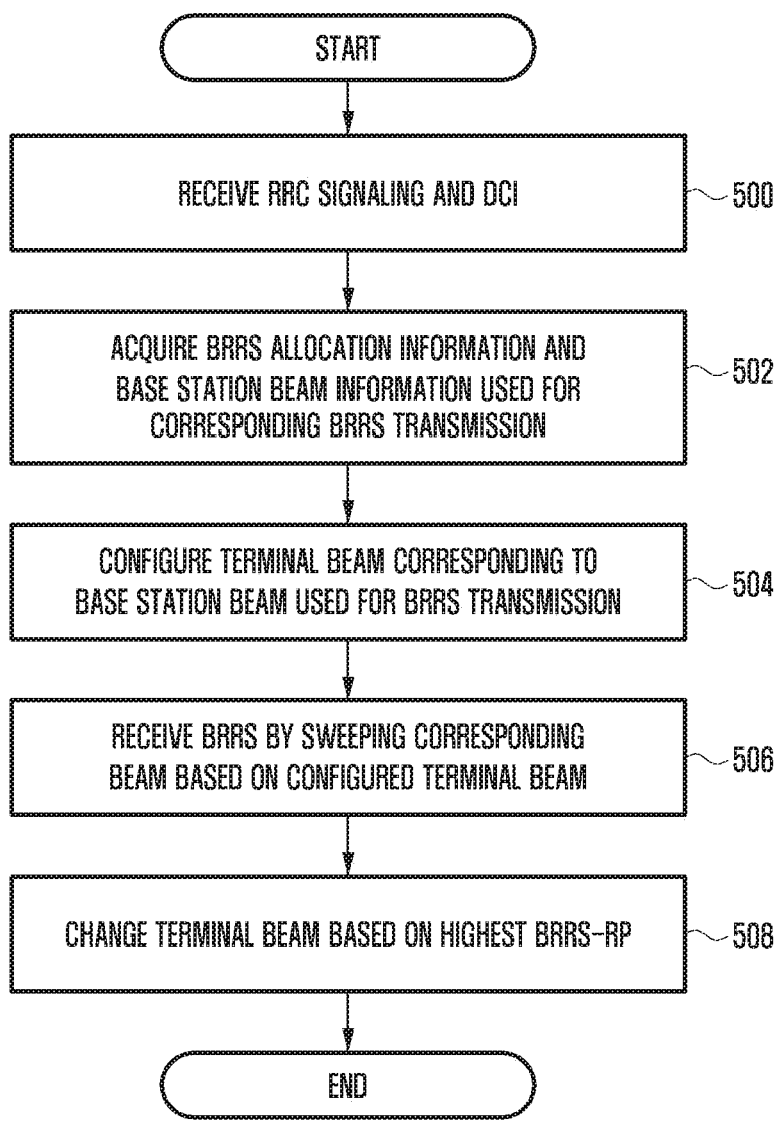
FIG. 5 is a control flowchart explaining a beam refinement mode operation by a terminal according to an embodiment of the disclosure.

FIG. 5 is a control flowchart explaining a beam refinement mode operation by a terminal according to an embodiment of the disclosure.

Referring to FIG. 5, the terminal 201, at operation 500, receives RRC signaling and DCI. In this case, the terminal 201 may receive control information received from the RRC through a control message, for example, MAC-CE, instead of the RRC signaling. Further, the RRC signaling or the control message may be received periodically/aperiodically. In the following description, for convenience in explanation, it is assumed that the control information is transmitted through the RRC signaling. Further, reception of the RRC signaling and the DCI at operation 500 is merely exemplary for convenience in explanation, and it is to be noted that it does not mean that reception of both the RRC signaling and the DCI is necessary. In general, the RRC signaling and the DCI may be separately received.

After receiving the RRC signaling and the DCI at operation 500, the terminal 201, at operation 502, may acquire BRRS allocation information and base station beam information used for the corresponding BRRS transmission. As described above, the BRRS process and BRRS identifier configuration information may be acquired through the RRC signaling, and the BRRS request, specific BRRS process, and OFDM symbol allocation indication information may be acquired through the DCI. Since the detailed explanation thereof has already been made, the duplicate explanation thereof will be omitted.

Thereafter, the terminal 201, at operation 504, may configure the terminal beam corresponding to the base station beam used for the BRRS transmission. As described above, such a beam configuration scheme may select one of a plurality of terminal beams that can be used in the terminal 201. In this case, the selection method may first select the most recently used beam, or may randomly select the beam.

After the terminal beam configuration, the terminal 201, at operation 506, may receive the BRRS by sweeping the corresponding base station beam based on the configured terminal beam. Hereinafter, the terminal beam sweeping operation will be described again. For convenience in explanation, as exemplified above, explanation will be made on the assumption that the terminal uses four terminal beams.

If it is assumed that serial numbers 1, 2, 3, and 4 are respectively given to the four terminal beams, terminal #1 beam, terminal #2 beam, terminal #3 beam, and terminal #4 beam may be terminal beams in different directions. In this case, at operation 506, the terminal may configure the terminal #2 beam as the terminal beam to receive the BRRS, and may measure the RSRP value. Further, since the terminal beam sweeping operation is performed, the terminal does not perform the sweeping only with respect to the terminal #2 beam, but may perform the same operation even with respect to other beams. Accordingly, in case of using the terminal #2 beam, the terminal 201 may receive the BRRS using the next terminal #3 beam, measure the RSRP value, and thereafter, receive the BRRS using the terminal #4 beam, measure the RSRP value, and last receive the BRRS using the terminal #1 beam, and measure the RSRP value. As described above, the terminal may receive the BRRS and measure the RSRP through the sweeping operation with respect to all the terminal beams.

After receiving the BRRS by sweeping the base station beam, the terminal 201, at operation 508, may change the terminal beam based on the highest BRRS-RP. That is, at operation 508, the terminal 201 may change the terminal beam based on the highest RSRP among the RSRPs from terminal #1 beam to terminal #4 beam.

3. Antenna Selection Operation Scheme

The BRRS may be used for base station antenna selection in addition to the method for performing the base station and terminal beam refinement. In an environment where the same beam is transmitted, effective channel gains for antenna ports differ from one another, and thus it is possible to select an antenna capable of maximizing diversity or multiplexing gain.

For example, in case of selecting an antenna for space frequency block coding (hereinafter, referred to as "SFBC"), the base station allocates the same beam for antenna ports. The base station allocates respective antenna ports to one BRRS ID, and the terminal measures the BRRS-RP by sweeping the terminal beam with respect to respective BRRS IDs. In case of selecting two antenna ports, the terminal may calculate an effective channel gain generated by a combination of two antennas based on the BRRS-RP received with the same received beam, and may report BRRS IDs corresponding to two antennas having the highest channel gain. In order to select the best antenna port through combining and comparison of the BRRS-based received signals, the base station should indicate the antenna selection using the corresponding BRRS during the BRRS transmission. Indication of the antenna selection mode of the base station is possible as follows.

(1) An indication bit for mode selection is added to the DCI requiring the BRRS. It is possible to indicate 'on' or 'off' for the antenna selection using one indication bit.

Figure 6:
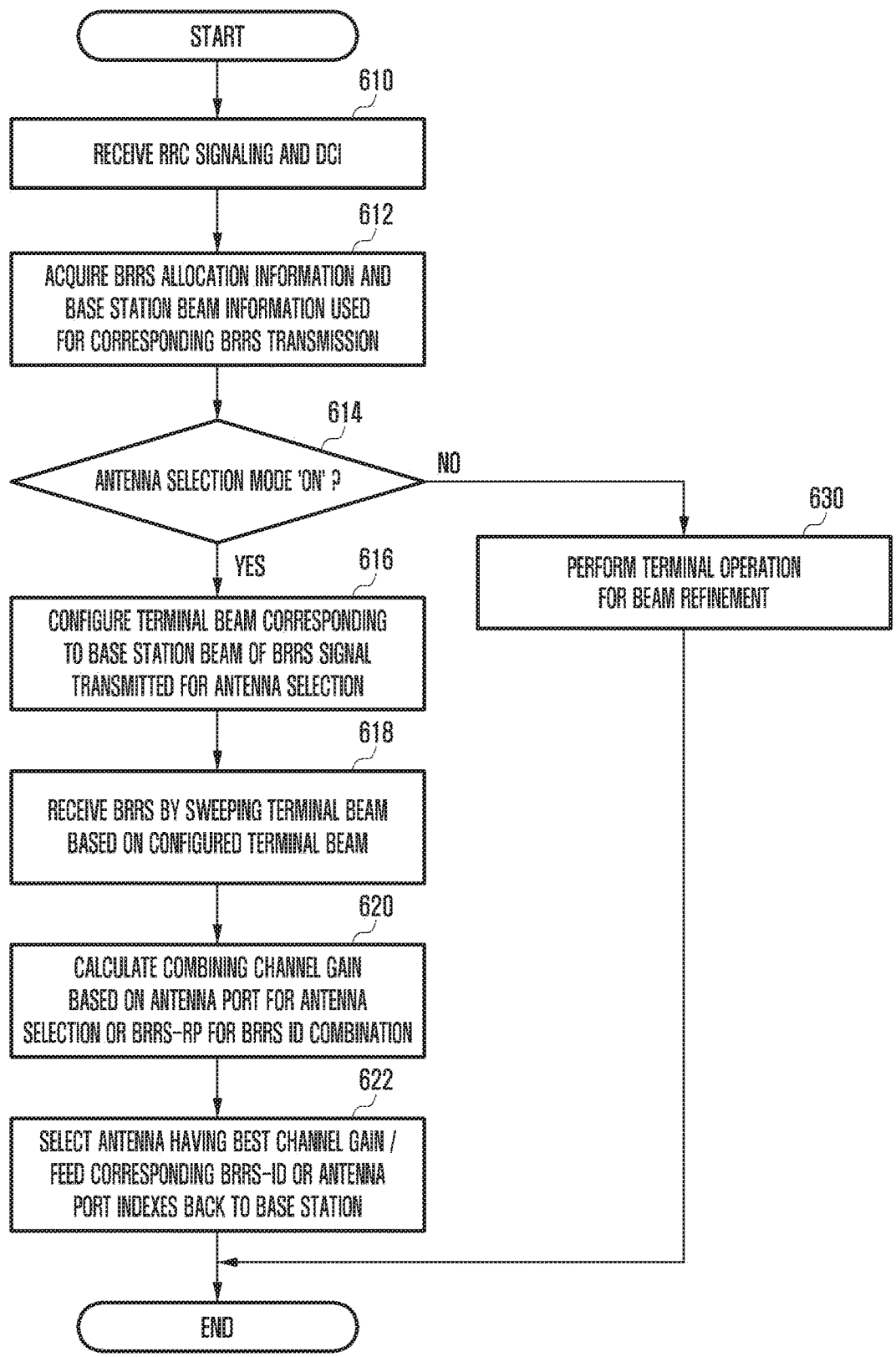
FIG. 6 is a flowchart explaining a control operation by a terminal in accordance with an antenna selection mode or a beam refinement mode according to an embodiment of the disclosure.

FIG. 6 is a flowchart explaining a control operation by a terminal in accordance with an antenna selection mode or a beam refinement mode according to an embodiment of the disclosure.

Referring to FIG. 6, the terminal 201, at operation 610, may receive RRC signaling and DCI. As described above, the terminal 201 may receive control information received from the RRC through a control message, for example, MAC-CE, instead of the RRC signaling. Further, the RRC signaling or the control message may be received periodically/aperiodically. In the following description, for convenience in explanation, it is assumed that the control information is transmitted through the RRC signaling. Further, reception of the RRC signaling and the DCI at operation 610 is merely exemplary for convenience in explanation, and it is to be noted that it does not mean that reception of both the RRC signaling and the DCI is necessary. In general, the RRC signaling and the DCI may be separately received.

Thereafter, the terminal 201, at operation 622, may acquire BRRS allocation information and base station beam information used for the corresponding BRRS transmission. Since the contents of acquisition of the base station beam information have already been explained, additional explanation thereof will be omitted.

As acquiring the base station beam information, the terminal 201 may check whether the antenna selection mode is in an 'on' state as described above. That is, the terminal may add an indication bit for mode selection to the DCI in which the base station 202 requires the BRRS, and may check 'on' or 'off' of the antenna selection using one transmitted indication bit. For example, if the antenna selection mode is in an 'on' state, the terminal may configure the indication bit to '1', whereas if the antenna selection mode is in an 'off' state, the terminal may configure the indication bit to '0'. The on/off indication bit value of the antenna selection mode may be oppositely configured, and such information may be information pre-engaged between the base station 202 and the terminal 201.

If the antenna selection mode is in an 'on' state as the result of the checking at operation 614, the terminal 201 proceeds with operation 618, whereas if the antenna selection mode is in an 'off' state, the terminal 201 proceeds with operation 630. In case of proceeding with operation 630, the terminal 201 may perform a terminal operation for beam refinement. Since the terminal operation for the beam refinement has been described as described above, the duplicate explanation thereof will be omitted.

In contrast, in case of proceeding from operation 614 to operation 616, that is, if the antenna selection mode is in an 'on' state, the terminal 201 may configure the terminal beam corresponding to the base station beam of the BRRS signal transmitted for the antenna selection. In general, terminal beam configuration corresponding to the base station beam of the BRRS signal may configure the beam previously used. If the terminal beam is refined through the beam refinement operation, the refined terminal beam may be selected.

After configuring the terminal beam at operation 616, the terminal 201, at operation 618, may receive the BRRS by sweeping the terminal beam based on the configured terminal beam. Since the reception of the BRRS through sweeping of the terminal beam has been described as described above, additional explanation thereof will be omitted.

Further, the terminal 201, at operation 620, may calculate the gain of the combined channel based on the BRRS-RP for an antenna port for the antenna selection or BRRS ID combination. Calculation of the combined channel gain at operation 620 may be calculation of the combined channel gain by adding BRRS-RP values measured from two or more antenna ports or BRRS IDs. For example, if three antenna ports or BRRS IDs are combined by two channels, the number of combinable cases is 3 in total, whereas if four antenna ports or BRRS IDs are combined by two channels, the number of combinable cases is 6. The combining channel gain can be calculated by combining two channels, three channels, or more than three channels in accordance with the number of antenna ports or the number of BRRS IDs.

Thereafter, the terminal 201, at operation 622, may select the antenna or antenna port having the best channel gain, and may feed the corresponding BRRS-ID or antenna port indexes back to the base station 202. Here, the antenna having the best channel gain may be the antenna or antenna port having the highest BRRS-RP value. At operation 622, the terminal 201 may feed the base station antenna corresponding to the antenna port index or BRRS-ID having the best channel gain or combining channel gain back to the base station 202. Accordingly, the base station 202 may use the base station antenna corresponding to the best antenna port index or BRRS-ID from the terminal 201 for SFBC transmission.

Figure 7:
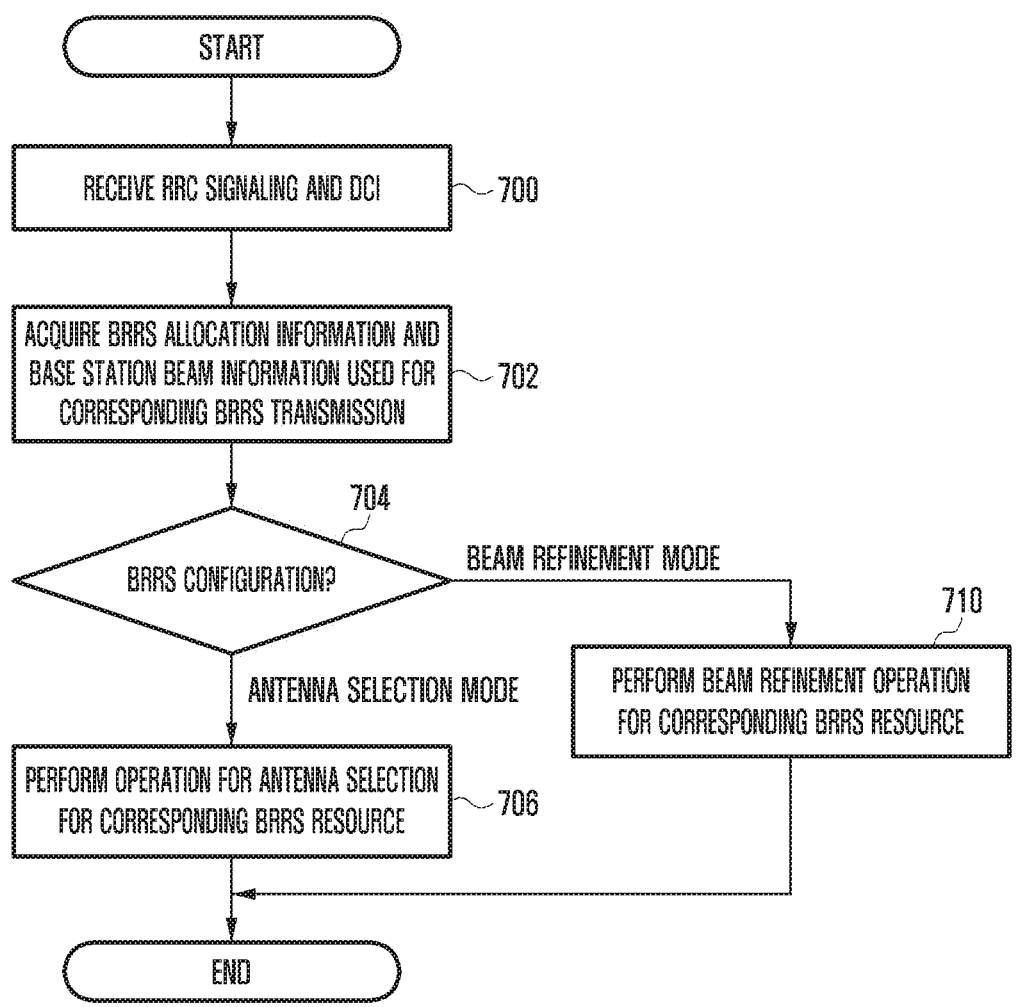
FIG. 7 is a control flowchart explaining simultaneous performing of antenna selection and beam refinement mode by a terminal according to an embodiment of the disclosure.

FIG. 7 is a control flowchart explaining simultaneous performing of antenna selection and beam refinement mode by a terminal according to an embodiment of the disclosure.

At operation 700, the terminal 201 may receive RRC signaling and DCI. As described above, the terminal 201 may receive control information through a control message instead of the RRC signaling. Since the above-described operation has been described several times, additional explanation thereof will be omitted.

Thereafter, the terminal 201, at operation 702, may acquire BRRS allocation information and base station beam information used for the corresponding BRRS transmission using the received RRC signaling and DCI. Thereafter, the terminal 201, at operation 704, may check whether the BRRS configuration corresponds to an antenna selection mode or a beam refinement mode. Such a mode configuration checking method may be performed as follows.

For example, if a specific BRRS process or BRRS ID is allocated from a configurable BRRS process or BRRS ID during BRRS transmission, the terminal 201 may determine allocation for supporting an antenna selection mode. Accordingly, if the specific BRRS process or BRRS ID is allocated from the BRRS process or BRRS ID, the terminal 201 proceeds from operation 704 to operation 706.

In contrast, if the specific BRRS process or BRRS ID is not allocated from the BRRS process or BRRS ID, the terminal 201 may determine a beam refinement mode. Accordingly, if the specific BRRS process or BRRS ID is not allocated from the BRRS process or BRRS ID, the terminal 201 proceeds from operation 704 to operation 710.

First, at operation 706, the terminal 201 may select the best antenna port through combining and comparison of signals received through the corresponding BRRS process or BRRS ID. In contrast, at operation 710, the terminal 201 may perform the beam refinement operation for the corresponding BRRS resource. Since the beam refinement operation for the BRRS resource has been described as described above, additional explanation thereof will be omitted.

As described above, using the configuration of FIG. 7, the terminal 201 may simultaneously transmit the configurations for the antenna selection mode and the beam refinement mode to the terminal 201 during the BRRS process or BRRS ID allocation. Further, through this, the terminal 201 may selectively perform one of the antenna selection mode and the beam refinement mode during the BRRS process or BRRS ID allocation.

Hereinafter, configurations of a terminal device and a base station as described above will be described with reference to the accompanying drawings.

Figure 8:
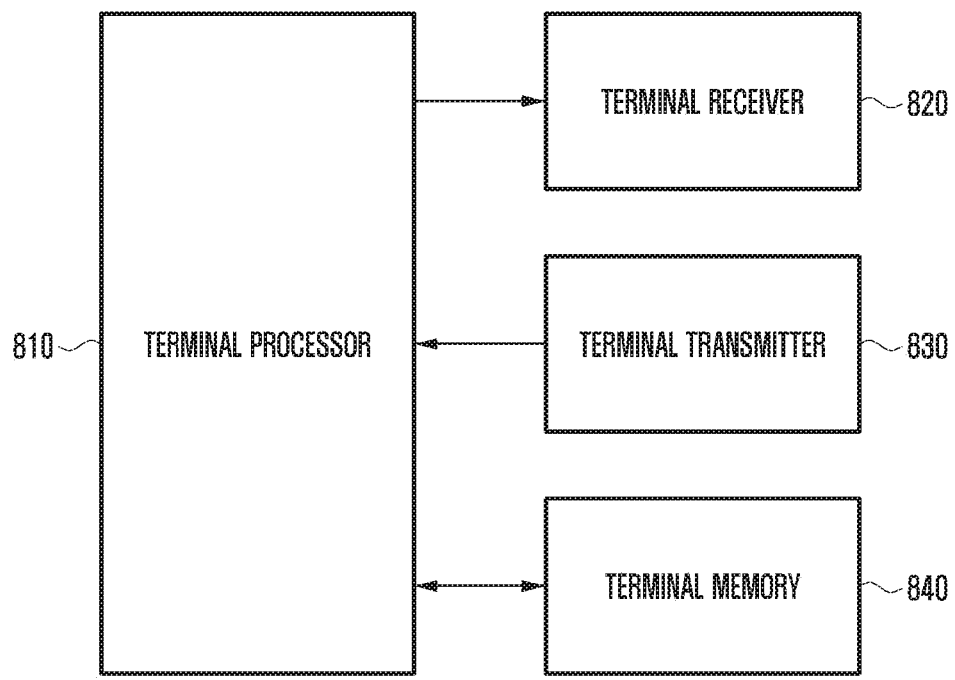
FIG. 8 is a primary block diagram of a terminal device according to an embodiment of the disclosure.

FIG. 8 is a primary block diagram of a terminal device according to an embodiment of the disclosure.

Referring to FIG. 8, a terminal device may include a terminal processor 810, a terminal receiver 820, a terminal transmitter 830, and a terminal memory 840.

The terminal processor 810 may perform the overall operation for signal reception according to the disclosure. In particular, the terminal processor 810 may perform a control operation as described above. That is, the terminal processor 810 may control a beam refinement operation and/or an antenna selection operation based on information received from the base station 202. In addition, the terminal processor 810 may control the result of beam reselection and antenna selection operation and/or generation and transmission of signals for reporting to the base station. Further, the terminal processor 810 may select a mode using the above-described information or may control BRRS-RP based beam selection and comparison operation. The terminal processor 810 may be composed of one processor or two or more processors. For example, the terminal processor 810 may be composed of an application processor and a communication processor to perform respective functional operations.

The terminal receiver 820 may receive the above-described signals through a predefined band, and may perform band down conversion of the received signals to be output. That is, the terminal receiver 820 may receive not only a higher layer signaling and/or a control message received from the base station but also various kinds of signals for the BRRS, and perform the band down conversion, demodulation, and decoding of the received signals to provide digital signals to the terminal processor 810. Further, the terminal receiver 820 may receive a downlink signal according the above-described embodiments, perform beam measurement by applying terminal beamforming in accordance with indication of the terminal processor, and provide the results of the measurement to the terminal processor 810 as digital values.

The terminal transmitter 830 may perform band up conversion of the signals to be transmitted, and may transmit the signals to the base station 202 or another communication device through an antenna (not illustrated).

As described above, the terminal receiver 820 and the terminal transmitter 830 may be implemented by one radio logic or radio module, and may be called a terminal radio processor. The terminal radio processor may be implemented in the form of one integrated chip or two or more chips, or may be implemented through circuit configurations.

The terminal memory 840 may store information signaled by the base station, and may store previously used terminal beam information and/or previously selected terminal antenna or antenna port information. Further, the terminal memory 840 may store information as described above in the above-described embodiments and/or information for control operations.

In FIG. 8, it is to be noted that only configurations necessary for explaining the disclosure are exemplified, and other configurations are omitted.

Figure 9:
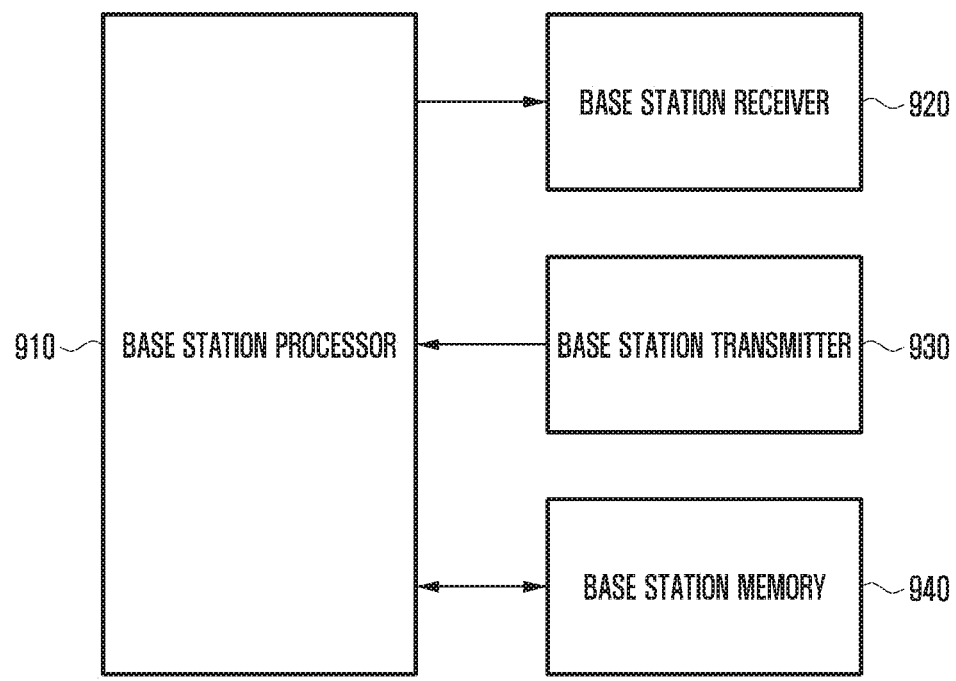
FIG. 9 is a functional block diagram of a base station device according to an embodiment of the disclosure.

FIG. 9 is a functional block diagram of a base station device according to an embodiment of the disclosure.

Referring to FIG. 9, functional operations of a base station according to the disclosure will be described. Referring to FIG. 9, the base station 202 may include a base station processor 910, a base station receiver 920, a base station transmitter 930, and a base station memory 940.

The base station processor 910 may decode and modulate data to be transmitted, and may map a reference signal according to the disclosure to a desired location together with the data or separately from the data to output the data to the base station transmitter 930. Further, the base station processor 910 may determine a process or a BRRS ID for the BRRS to the terminal 201, and may determine base station beams to be used. Further, the base station processor 910 may control various kinds of necessary operations as described above. For example, the base station processor 910 may control generation of information to be transmitted to at least one terminal, for example, configuration information, higher layer signaling, DCI and BRRS signal. The base station processor 910 may be configured by one processor or two or more processors.

The base station receiver 920 may low-noise-amplify and band-down-convert a signal received through an antenna into a baseband signal, and may perform demodulation and decoding to convert the analog signal into a digital signal. The base station receiver 920 may provide the information or signal converted into the digital signal to the base station processor 910. Further, the base station receiver 920 may receive a feedback signal from the terminal 201 as described above, and may provide the digital signal to the base station processor 910.

The base station transmitter 930 may up-convert and power-amplify the signal to be transmitted into a frequency band operating in the system, and may transmit the signal to the terminal through one or two or more antennas. That is, the base station transmitter 930 may transmit a higher layer signaling signal, and signals for DCI and BRRS to the terminal using at least one base station beam as described above.

The base station receiver 920 and the base station transmitter 930 as described above may be commonly called a radio processor, and may be implemented by one integrated module. Such an integrated module may be configured to transmit and receive signals with one terminal unit or a plurality of terminals.

The base station memory 940 may store various kinds of data necessary in the base station and various pieces of information, such as configuration information of each terminal, base station beam information and terminal beam information. In the block diagram of FIG. 9, it is to be noted that the shapes of the constituent elements of the base station are not specially limited, but merely represent functional blocks.

Further, embodiments of the disclosure disclosed in the specification and the drawings have been presented to assist those of ordinary skill in the art to gain a comprehensive understanding of the disclosure, and do not limit the scope of the disclosure. It will be apparent to those of ordinary skill in the art to which the disclosure pertains that various modifications are possible based on the technical concept of the disclosure.

INDUSTRIAL APPLICABILITY

The disclosure can be used in case of selecting beams between a terminal and a base station in a wireless communication system using a beamforming technique.

The invention claimed is:

1. A method by a base station for indicating a terminal beam selection in a wireless communication system using a beamforming technique, comprising:
    transmitting, to the terminal via higher layer signaling, a beam refinement reference signal (BRRS) process and configuration of a BRRS identifier, wherein the configuration of the BRRS identifier includes mapping information between a BRRS resource and an antenna port of the base station;

transmitting, to the terminal, downlink control information (DCI) including a BRRS request and the BRRS process, the BRRS request including a field having 3 bits indicating a type of the BRRS request;

transmitting, to the terminal, a BRRS for each base station beam based on the DCI and the higher layer signaling;

receiving, from the terminal, refined beam information; and performing base station beam refinement based on the refined beam information, wherein the BRRS is an aperiodic channel state information reference signal, and wherein the BRRS process includes at least one BRRS resource, and each of the at least one BRRS resource identifies a corresponding at least one antenna port.

2. The method of claim 1, wherein the higher layer signaling further comprises information in which indexes for base station beams and indication information for indicating the respective beam indexes are respectively mapped to each other.

3. The method of claim 1, wherein the higher layer signaling further comprises information in which two or more of a plurality of base station beams are mapped to indication information for indicating the two or more of the plurality of base station beams as one pair.

4. The method of claim 1, wherein the DCI further comprises information indicating a location of a subframe in which the BRRS is transmitted based on information predefined in the higher layer signaling, an antenna port, an OFDM symbol, and subcarrier location information.

5. The method of claim 1, wherein the DCI includes the BRRS request, the BRRS process, and an orthogonal frequency division multiplexing (OFDM) symbol allocation indication.

6. A base station device for indicating a terminal beam selection in a wireless communication system using a beamforming technique, comprising:
a radio processor configured to transmit and receive signals with at least one terminal;
a memory storing base station beam information and base station beam mapping information to be transmitted to a terminal, terminal beam information, allocation information of a beam refinement reference signal (BRRS), a beam refinement reference signal identifier (BRRS ID), and a BRRS process; and
a base station processor configured to control to:
transmit, to the terminal through the radio processor via higher layer signaling, a BRRS process and configuration of a BRRS identifier, wherein the configuration of the BRRS identifier includes mapping information between a BRRS resource and an antenna port of the base station,
transmit, to the terminal through the radio processor, downlink control information (DCI) including a BRRS request and the BRRS process, the BRRS request including a field having 3 bits indicating a type of the BRRS request,
transmit, to the terminal through the radio processor, a BRRS for each base station beam based on the DCI and the higher layer signaling,
receive, from the terminal through the radio processor, refined beam information, and
perform base station beam refinement based on the refined beam information, wherein the BRRS is an aperiodic channel state information reference signal, and
wherein the BRRS process includes at least one BRRS resource, and each of the at least one BRRS resource identifies a corresponding at least one antenna port.

7. The base station device of claim 6, wherein the higher layer signaling further comprises information in which indexes for base station beams and indication information for indicating the respective beam indexes are respectively mapped to each other.

8. The base station device of claim 6, wherein the higher layer signaling further comprises information in which two or more of a plurality of base station beams are mapped to indication information for indicating the two or more of the plurality of base station beams as one pair.

9. The base station device of claim 6, wherein the DCI further comprises information indicating a location of a subframe in which the BRRS is transmitted based on information predefined in the higher layer signaling, an antenna port, an OFDM symbol, and subcarrier location information.

10. A method by a terminal for beam selection in a wireless communication system using a beamforming technique, comprising:
receiving, from a base station via higher layer signaling, a beam refinement reference signal (BRRS) process and configuration of a BRRS identifier, wherein the configuration of the BRRS identifier includes mapping information between a BRRS resource and an antenna port of the base station;
receiving, from the base station, downlink control information (DCI) including a BRRS request and the BRRS process, the BRRS request including a field having 3 bits indicating a type of the BRRS request;
receiving a BRRS for each base station beam based on the DCI and the higher layer signaling by sweeping a plurality of terminal beams;
measuring a received signal strength of the received BRRS from the base station based on the DCI and the higher layer signaling;
selecting the BRRS having a highest received signal strength based on the received signal strength measurement; and
transmitting, to the base station, refined beam information,
wherein the BRRS is an aperiodic channel state information reference signal, and
wherein the BRRS process includes at least one BRRS resource, and each of the at least one BRRS resource identifies a corresponding at least one antenna port.

11. The method of claim 10, further comprising transmitting, to the base station, received signal strength information.

12. A terminal device for beam selection in a wireless communication system using a beamforming technique, comprising:
a radio processor configured to transmit and receive signals with a base station;
a memory storing information received from the base station and storing terminal beam information and beam reselection information; and
a terminal processor configured to:
control the radio processor to receive, from a base station, higher layer signaling including a beam refinement reference signal (BRRS) identifier and configuration of a BRRS process, wherein the configuration of the BRRS identifier includes mapping information between a BRRS resource and an antenna port of the base station, control the radio processor to receive, from the base station, downlink control information (DCI) including a BRRS request and the BRRS process, the BRRS request including a field having 3 bits indicating a type of the BRRS request, control the radio processor to receive, from the base station, a BRRS for each base station beam based on the DCI and the higher layer signaling by sweeping a plurality of terminal beams, measure a received signal strength of the received BRRS from the base station based on the DCI and the higher layer signaling, select the BRRS having a highest received signal strength based on the received signal strength measurement, and control the radio processor to transmit, to the base station, refined beam information, wherein the BRRS is an aperiodic channel state information reference signal, and wherein the BRRS process includes at least one BRRS resource, and each of the at least one BRRS resource identifies a corresponding at least one antenna port.

13. The terminal device of claim 12, wherein the terminal processor is configured to transmit, to the base station, received signal strength information.

14. A method by a terminal for beam selection and antenna selection in a wireless communication system using a beamforming technique, comprising:

receiving, from a base station via higher layer signaling, a beam refinement reference signal (BRRS) process and configuration of a BRRS identifier, wherein the configuration of the BRRS identifier includes mapping information between a BRRS resource and an antenna port of the base station;

receiving, from the base station, downlink control information (DCI) including a BRRS request, the BRRS process and an antenna selection mode, the BRRS request including a field having 3 bits indicating a type of the BRRS request;

checking whether the antenna selection mode is configured in the DCI;

configuring a plurality of terminal beams based on the antenna selection mode;

receiving, from the base station, the BRRS for each base station beam based on the DCI and the higher layer signaling by sweeping the configured plurality of terminal beams;

measuring a received signal strength of the BRRS for each of the terminal beams;

calculating a coupling channel gain for a combination of the terminal beams and the base station beams based on the measured received signal strength;

selecting an antenna having a best channel gain; and transmitting, to the base station, selected antenna information, wherein the BRRS is an aperiodic channel state information reference signal, wherein the BRRS process includes at least one BRRS resource, and each of the at least one BRRS resource identifies a corresponding at least one antenna port.

15. The method of claim 14, wherein the configuration of the antenna selection mode is explicitly indicated in the DCI.

16. The method of claim 14, wherein the configuration of the antenna selection mode is determined that the antenna selection mode has been configured in case where information included in the higher layer signaling includes specific BRRS information, and is determined that the antenna selection mode has not been configured in case where the information included in the higher layer signaling does not include the specific BRRS information.

17. The method of claim 14, further comprising:

receiving, from the base station, the BRRS for each of the base station beams based on the DCI and the higher layer signaling by sweeping the plurality of the terminal beams in case where the antenna selection mode has not been configured;

measuring the received signal strength of the BRRS received corresponding to each of the terminal beams;

selecting the terminal beam having the highest received signal strength based on the measurement of the received signal strength; and transmitting, to the base station, terminal beam selection information and a reference signal identifier of the selected terminal beam.

18. A terminal device for beam selection or antenna selection in a wireless communication system using a beamforming technique, comprising:

a radio processor configured to transmit and receive signals with a base station;

a memory storing information received from the base station and storing terminal beam information and beam reselection information; and a terminal processor configured to:

control the radio processor to receive, from the base station via higher layer signaling, a beam refinement reference signal (BRRS) process and configuration of a BRRS identifier, wherein the configuration of the BRRS identifier includes mapping information between a BRRS resource and an antenna port of the base station, control the radio processor to receive, from the base station, downlink control information (DCI) including a BRRS request, the BRRS process and an antenna selection mode, the BRRS request including a field having 3 bits indicating a type of the BRRS request, check whether the antenna selection mode is configured in the DCI, control the radio processor to configure a plurality of terminal beams based on the antenna selection mode, control the radio processor to receive, from the base station, the BRRS for each base station beam based on the DCI and the higher layer signaling by sweeping the configured plurality of terminal beams, measure a received signal strength of the BRRS for each of the terminal beams, calculate a coupling channel gain for a combination of the terminal beams and the base station beams based on the measured received signal strength, select an antenna having a best channel gain, and control to transmit, to the base station, selected antenna information, wherein the BRRS is an aperiodic channel state information reference signal, and wherein the BRRS process includes at least one BRRS resource, and each of the at least one BRRS resource identifies a corresponding at least one antenna port.

19. The terminal device of claim 18, wherein the configuration of the antenna selection mode is explicitly indicated in the DCI.

20. The terminal device of claim 18, wherein the configuration of the antenna selection mode is determined that the antenna selection mode has been configured in case where information included in the higher layer signaling includes specific BRRS information, and is determined that the antenna selection mode has not been configured in case where the information included in the higher layer signaling does not include the specific BRRS information.

21. The terminal device of claim 18, wherein the terminal processor is configured to:
control the radio processor to receive, from the base station, the BRRS for each of the base station beams based on the DCI and the higher layer signaling by sweeping the plurality of the terminal beams in case where the antenna selection mode has not been configured,
control to measure the received signal strength of the BRRS received corresponding to each of the terminal beams,
select the terminal beam having the highest received signal strength based on the measurement of the received signal strength, and
control the radio processor to transmit, to the base station, terminal beam selection information and a reference signal identifier of the selected terminal beam.

* * * * *